United States Patent [19]

Oinoue et al.

[11] Patent Number: 4,492,449
[45] Date of Patent: Jan. 8, 1985

[54] APPARATUS AND TECHNIQUE FOR DETECTING AND CONTROLLING THE FOCUSING OF AN OPTICAL SYSTEM BY IMAGE SHARPNESS AND LATERAL SHIFT TECHNIQUES

[75] Inventors: Kenichi Oinoue, Tokyo; Asao Hayashi, Hachioji; Junichi Nakamura, Hachioji; Masatoshi Ida, Hachioji; Masahiro Aoki, Tokyo; Kenji Fukuoka, Fussa, all of Japan

[73] Assignee: Olympus Optical Co. Ltd., Japan

[21] Appl. No.: 499,491

[22] Filed: May 31, 1983

[30] Foreign Application Priority Data

Jun. 4, 1982 [JP] Japan ................... 57-95869

[51] Int. Cl.³ ............................................. G03B 7/099
[52] U.S. Cl. ................................................... 354/407
[58] Field of Search ................ 354/400, 402, 406, 407

[56] References Cited

U.S. PATENT DOCUMENTS

| | | | |
|---|---|---|---|
| 4,314,151 | 2/1982 | Suzuki et al. | 354/402 |
| 4,333,716 | 6/1982 | Sakane et al. | 354/406 |
| 4,341,953 | 7/1982 | Sakai et al. | 354/406 |
| 4,349,254 | 9/1982 | Jyojiki et al. | 354/406 |

*Primary Examiner*—Russell E. Adams
*Attorney, Agent, or Firm*—Parkhurst & Oliff

[57] ABSTRACT

In a method and apparatus for detecting focus condition of an imaging optical system, the focus condition is detected in accordance with a combination of two different detection methods such as an image sharpness detection and an image lateral shift detection by using first and second light receiving element arrays for the image sharpness detection and a third light receiving element array for the image lateral shift detection. For making the construction of the apparatus compact and simple, these light receiving element arrays are formed on the same semiconductor substrate. Further a light flux dividing prism and a lenticular lens array are formed integrally with each other. According to the focus detection method of the present invention, it is possible to detect the focus condition for various kinds of subjects accurately over a wide range by using both the image sharpness detection and image lateral shift detection even in a range near an in-focus position.

17 Claims, 15 Drawing Figures

FIG_4A
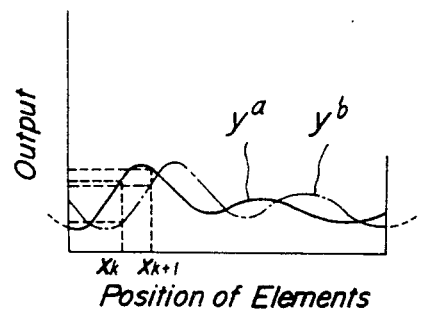
FIG_4B
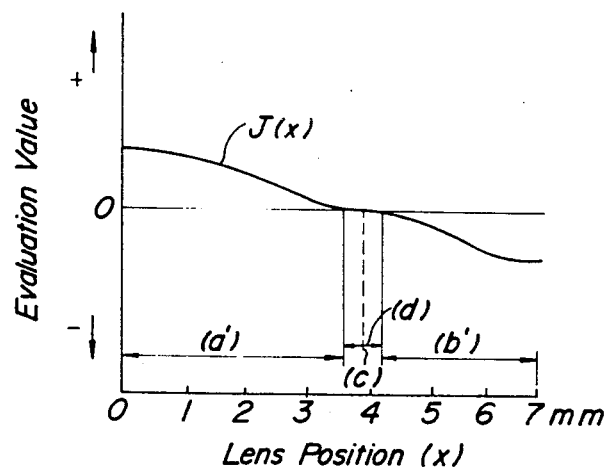

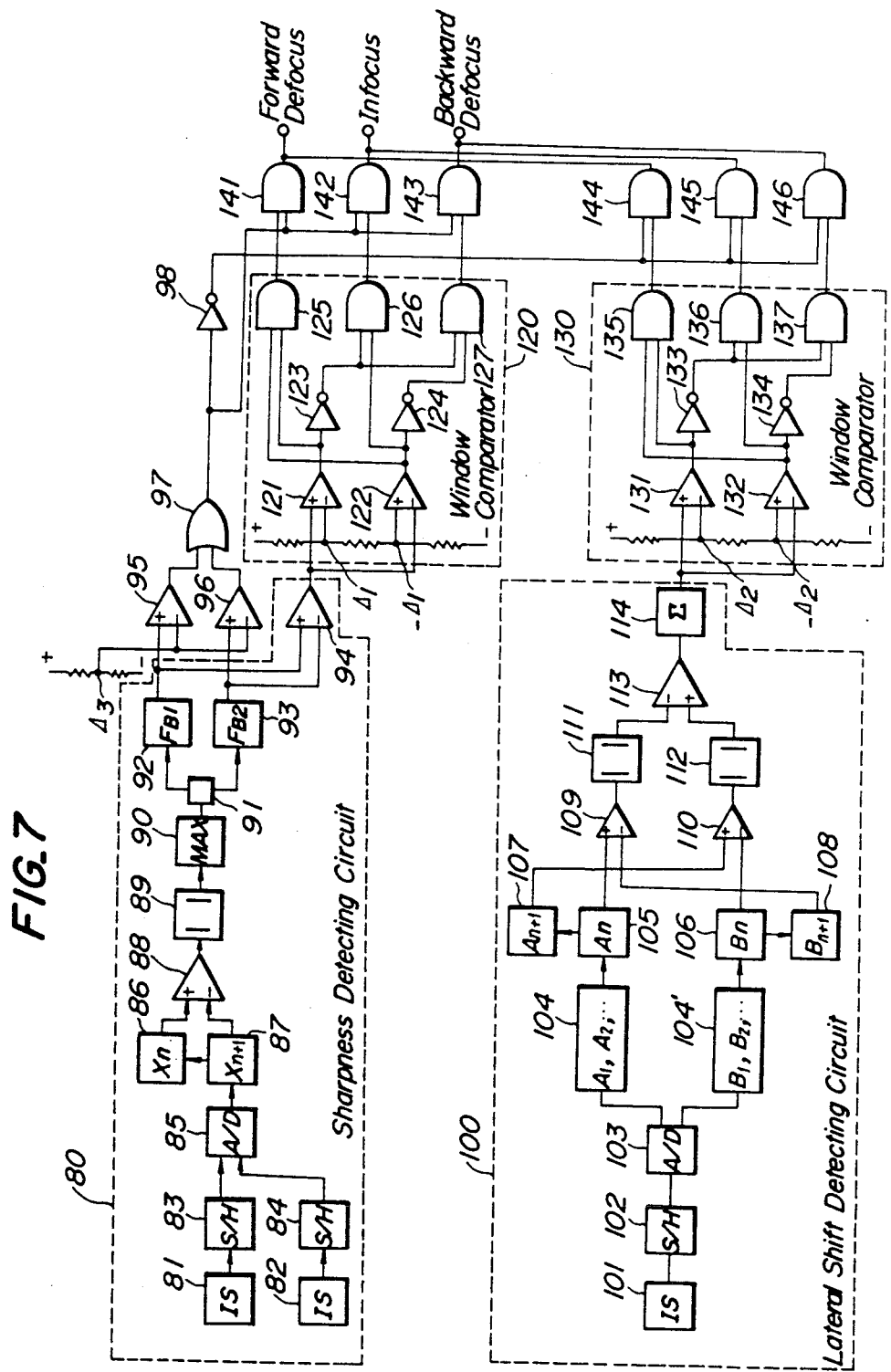

APPARATUS AND TECHNIQUE FOR DETECTING AND CONTROLLING THE FOCUSING OF AN OPTICAL SYSTEM BY IMAGE SHARPNESS AND LATERAL SHIFT TECHNIQUES

BACKGROUND OF THE INVENTION

The present invention relates to a focus detection method and apparatus for use in a camera, a microscope, an optically recording and reproducing apparatus and so on.

Heretofore, as for the method for effecting a focus control, there has been provided mainly two methods, one of which is a focus detection system utilizing an image sharpness and the other of which is a focus detection system utilizing a lateral image shift. The above-mentioned two focus detection systems have excellent advantages, respectively, but on the other hand they have also inherent disadvantages. Therefore, it is difficult to perform an accurate focus control by using only one method. In the focus detection system by utilizing the image sharpness, highly accurate focus detection can be effected for an image having abrupt light intensity distribution, and thus when this system is applied to an automatic focusing system of a TTL single-lens reflex camera, it is possible to use various lenses each having a different F-number without causing a light eclipse. However, in case of an extremely de-focused condition, since an evaluation value of this system becomes extremely small and a variation of the evaluation value becomes gentle correspondingly, it is not possible to detect a de-focusing direction precisely and thus a lens driving direction cannot be determined. In case of applying this system to a subject having a small contrast variation such as a part of a human face, it is difficult to effect the focusing control precisely even near an in-focused condition because the evaluation value also becomes small. Moreover, in the focus detection system utilizing a lateral image shift, the focusing condition can be detected for the subject having the small contrast variation, and thus it is possible to detect the lens driving direction even in the extremely de-focused condition. However, if this focus detection system is applied to the automatic control of the TTL single-lens reflex camera, light impinging upon the light receiving element is shaded in the case of a small diaphragm number, and thus the accuracy of the focus control is decreased. Moreover, in this case, since the accuracy of the focus control is decreased even for the subject having the small contrast, it is difficult to effect the focus detection precisely. That is to say, when utilizing the image sharpness focus detection system, the detection sensitivity is low for the image including a low spatial frequency component. Contrary to this, when utilizing the lateral shift focus detection system, the detection sensitivity is low for the low contrast image (wherein a difference in the light intensity between a maximum value and a minimum value is small). Further, the lateral shift focus detection system has such a disadvantage that near the in-focused condition a detection gain becomes small theoretically and thus it is not possible to perform the focusing control accurately.

In order to eliminate the drawbacks mentioned above, in a co-pending U.S. patent application an apparatus for effecting the focus controlling by combining two focus detection systems has been proposed. In the apparatus utilizing these two systems, the focus detection is performed in such a manner that use is made of the lateral shift focus detection system in the de-focused region and near the in-focused condition use is made of the image sharpness focus detection system, by taking into consideration their detection characteristic. However, in the image sharpness focus detection system, there is a condition wherein a detection signal cannot be derived even near the in-focused condition for the essentially low contrast image other than for the de-focused image mentioned above. In this case, even if the focus detection system is changed near the in-focused condition from the lateral shift one to the image sharpness one, it is not possible to perform the focus detection in an accurate manner.

SUMMARY OF THE INVENTION

The present invention has for its object to eliminate the drawbacks mentioned above and to provide a method for effecting a focus detection for all images regardless of its in-focused or de-focused condition.

According to the invention, in a method for detecting a focus condition of an imaging optical system by effecting an image sharpness detection to produce a first evaluation function value S representing a sharpness of an image formed by said imaging optical system on at least two light receiving element arrays and by effecting an image lateral shift detection to produce a second evaluation function value S' representing a lateral shift of two images formed on at least one light receiving element array, said two images being formed by light fluxes transmitted through different areas of the imaging optical system, the improvement comprises the steps of:

detecting the focus condition of the imaging optical system by processing said second evaluation function value S' produced by the image lateral shift detection in a first region far away from an in-focus position; and detecting the focus condition of the imaging optical system by processing both said first and second evaluation function values S and S' in a second region near the in-focus position.

In the case of performing the focus detection method according to the invention, there are provided three arrays of light receiving elements, two of which are used for the image sharpness detection and one of which is used for the image lateral shift. It is known to arrange the former two arrays on the same semiconductor substrate. In order to make the focus detection apparatus small and compact, it is preferable to arrange these three light receiving element arrays on the same substrate.

The present invention also relates to an apparatus for performing the focus detection method described above and has an object to provide a focus detection apparatus having a small and compact construction.

According to the invention, in an apparatus for detecting a focus condition of an imaging optical system comprising means for dividing a light flux transmitted through the imaging optical system into at least three light fluxes, first and second light receiving element arrays arranged on respective sides of a predetermined focal plane for receiving first and second divided light fluxes to produce first and second sets of photoelectrically converted output signals, means for processing said first and second sets of output signals to derive a first evaluation function value S representing a sharpness of images formed on said first and second light receiving element arrays on the basis of an image sharpness detection, a third light receiving element array arranged near the focal plane for producing a third set of photoelectrically converted output signals, an auxiliary optical system arranged in front of the third light receiving element array for forming two images thereon by means of light fluxes transmitted through different areas of said imaging optical system, means for processing the third set of output signals to derive a second evaluation function value S' representing a lateral shift of said two images formed on the third light receiving element array on the basis of an image lateral shift detection, and means for processing said first and second evaluation functions S and S' to detect the focus condition of the imaging optical system, the improvement comprises a single semiconductor substrate on which said first, second and third light receiving element arrays are arranged.

BRIEF DESCRIPTION OF THE DRAWINGS

FIGS. 4A and 4B are graphs depicting evaluation values for use in a focus detection system utilizing a lateral image shift;

FIG. 7 is a block diagram showing one embodiment of a signal processing circuit of the focus detection apparatus according to the invention;

DESCRIPTION OF THE PREFERRED EMBODIMENTS

Figure 1:
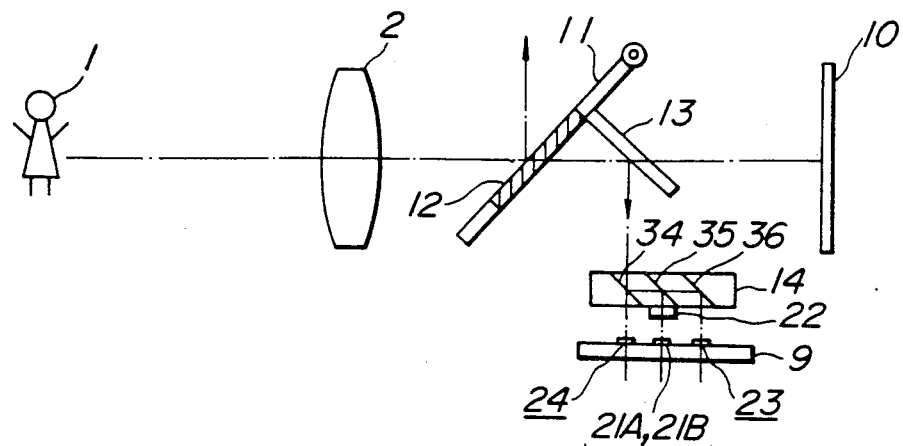
FIG. 1 is a schematic view showing an embodiment of the focus detection apparatus according to the invention.

FIG. 1 is a schematic view showing one embodiment of the focus detection apparatus employing both image sharpness and lateral shift detection methods according to the invention. A light receiving device comprises a substrate 9, a pair of arrays 23 and 24 of light receiving elements for the image sharpness detection and an array 21 of light receiving elements for the image lateral shift detection. These light receiving element arrays 23 and 24 are arranged on respective sides of a predetermined focal plane which is conjugated with the film plane and are separated from the conjugated focal plane by equal distances, and the light receiving array 21 is arranged substantially at a plane optically equivalent to the focal plane. In case of applying the focus detection apparatus to a single-lens reflex camera, there is provided a half mirror 12 in a center portion of a quick-return mirror 11 arranged between the imaging lens system 2 and a film 10. A light flux transmitted through the half mirror 12 is reflected by a mirror 13 provided on the rear surface of the quick-return mirror 11 toward a light flux dividing prism 14. The prism 14 comprises half mirrors 34, 35 and a reflection mirror 36 and serves to divide an incident light flux into three light fluxes which are made incident upon the light receiving arrays 23, 24 and 21, respectively.

Figure 2:
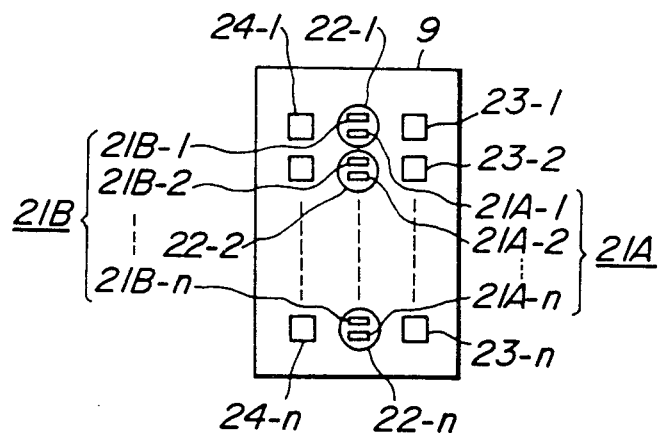
FIG. 2 is a schematic view showing one embodiment of the light detector according to the invention.

FIG. 2 is a plan view showing an embodiment of the light receiving device according to the invention. The light receiving element arrays 23 and 24 are constituted of the light receiving elements 23-1, 23-2 ... 23-n and 24-1, 24-2 ... and 24-n, and serves to detect the image sharpness. Moreover, the light receiving element array 21 is constituted of a plurality pairs of light receiving elements 21A-1, 21B-1; 21A-2, 21B-2; ... 21A-n, 21B-n, and each pair of light receiving elements 21A-i, 21B-i receives the light flux through one of auxiliary optical systems 22-i such as lenticular lenses and micro lenses. In the present invention, use may be made of various evaluation methods for the image sharpness and the image lateral shift detections proposed heretofore.

Figure 3A:
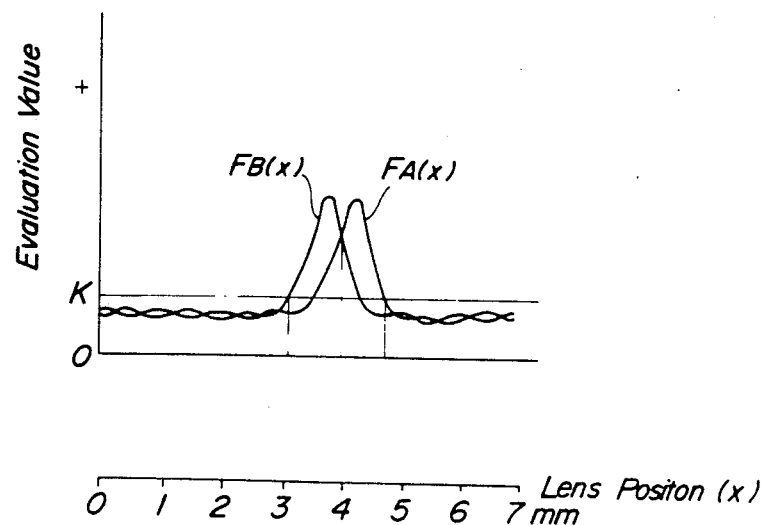
FIGS. 3A and 3B are graphs illustrating outputs of the light receiving elements and evaluation values for use in a focus detection system utilizing an image sharpness.
Figure 3B:
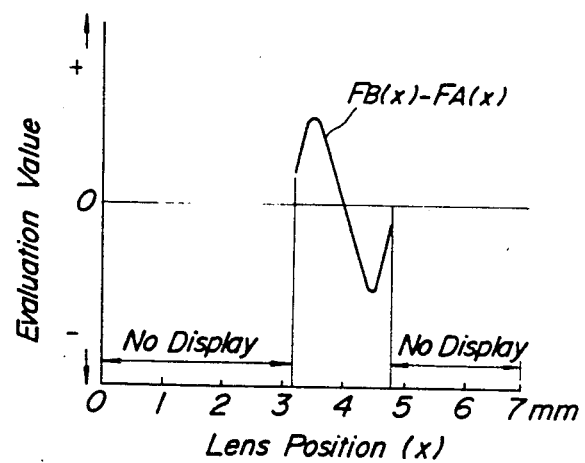

FIG. 3A shows curves representing a relation between the position of the lens system and evaluation functions $F_A(x)$ and $F_B(x)$ obtained by processing the output signals from the light receiving element arrays 24 and 23, respectively, wherein x is a position of the lens system with respect to a reference position x=0 at which the lens system is focused for an object situated at an infinite range. FIG. 3B illustrates a curve showing a difference $F_B(x)-F_A(x)$ between the evaluation functions $F_A(x)$ and $F_B(x)$ and this difference is used to determine the focal condition of the lens system. When both the evaluation functions $F_A(x)$ and $F_B(x)$ are smaller than K in FIG. 3A, the evaluation is no more effected, because in such a case the evaluation values do no longer contribute to the precise focus detection. As shown in FIG. 3B, when the image has a normal contrast, the difference $F_B(x)-F_A(x)$ has a very steep slope and thus, the focus condition can be detected with an extremely high sensitivity.

FIG. 4A shows curves $y^a$ and $y^b$ representing the outputs of the first and second light receiving elements 21A and 21B, respectively, and the following typical evaluation function J(x) is calculated by using such outputs $y^a$ and $y^b$;

$$J(x) = \sum_{k=1}^{n-1} (y_k^a - y_{k+1}^a)(y_k^b - y_{k+1}^b)$$

wherein outputs from the kth light receiving elements 21A-k and 21B-k in the example where the imaging lens system 2 is at a position x are denoted by $y_k^a$ and $y_k^b$, respectively. The typical evaluation value J(x) is shown in FIG. 4B, and in this case it is possible to obtain backwardly and forwardly defocused regions (a') and (b') having very wide ranges. However, in the in-focused region (d), the evaluation value J(x) has a small inclination and thus the accuracy of the focus detection near the best focus point (c) is low.

According to the invention, in order to obviate the above mentioned drawbacks, the image sharpness detection and the lateral shift detection are used in combination with each other particularly near the in-focus condition.

Figure 5A:
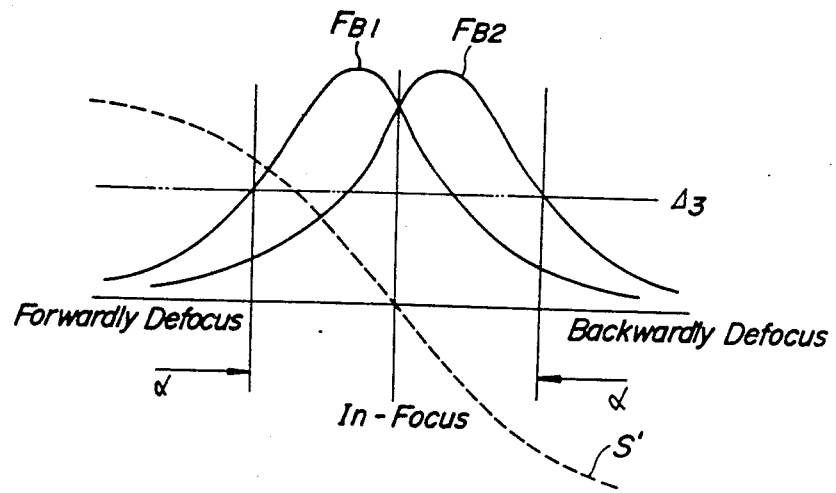
FIGS. 5A, 5B, 6A and 6B are graphs for explaining an operation of the focus detection method according to the invention.
Figure 5B:
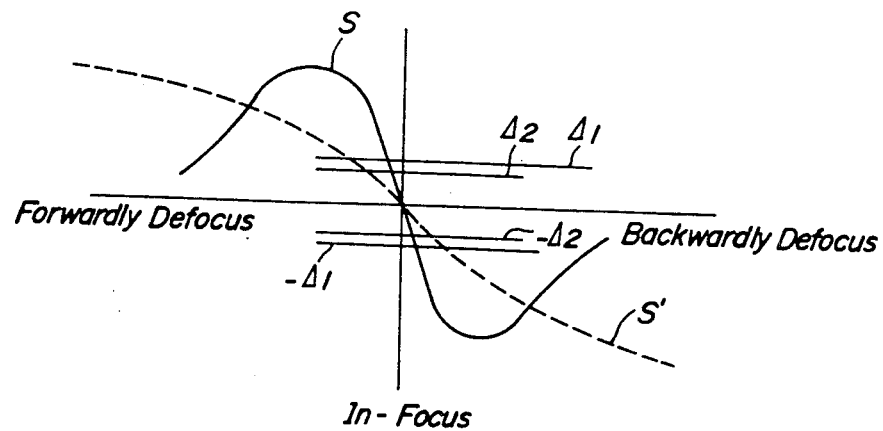

FIGS. 5A and 5B are graphs for explaining one embodiment of the focus detection method according to the invention. In FIG. 5A, curves $F_{B1}$ and $F_{B2}$ are evaluation functions for the image sharpness focus detection method respectively derived from a photoelectrically converted output of the arrays of light receiving elements 24, 23. In this embodiment, as for the evaluation functions $F_{B1}$ and $F_{B2}$, use is made of a maximum output difference between adjacent pixels represented by a formula $|X_n-X_{n+1}|_{MAX}$.

Moreover, a curve S' is an evaluation function for the lateral shift focus detection method derived from a relation between respective light receiving elements 21A, 21B of the array 21 shown in FIG. 2. In this case, if it is assumed that outputs of nth pair of light receiving elements 21A-$n$ and 21B-$n$ for receiving light fluxes passing through upper and lower halves of an exit pupil of the optical system 2 are $A_n$ and $B_n$, respectively, the evaluation function S' is derived from the following equation.

$$S' = \sum_n \{|A_n - B_{n+1}| - |A_{n+1} - B_n|\}$$

Further, a curve S in FIG. 5B is an evaluation function for the image sharpness detection derived from the difference between the aforementioned functions $F_{B1}$ and $F_{B2}$ and is represented by an equation $S=F_{B1}-F_{B2}$. As shown in FIGS. 5A and 5B, in the focus detection methods according to the invention, there are provided several threshold values $\pm\Delta_1$, $\pm\Delta_2$, $\Delta_3$.

At first, as shown in FIG. 5A, the evaluation functions $F_{B1}$ and $F_{B2}$ for the image sharpness detection method are compared with the threshold level $\Delta_3$, and, if $F_{B1}<\Delta_3$ and $F_{B2}<\Delta_3$, the focus detection is performed by utilizing the image lateral shift detection method, because the image sharpness detection method becomes very inaccurate in regions $\alpha$ in FIG. 5A. On the contrary, when $F_{B1}>\Delta_3$ or $F_{B2}>\Delta_3$, the focus detections such as in-focus, forwardly de-focus, backwardly de-focus are effected by utilizing only the image sharpness detection method. In this case, since the evaluation function S for the image sharpness detection is varied abruptly near the in-focus region with respect to the lens position, it is possible to perform the focus detection in an accurate manner. Moreover, if the focus condition is largely apart from the best focus position, the de-focusing direction can be detected accurately by means of the lateral shift detection. It should be noted that the three light receiving element arrays are so arranged that the predetermined focal plane in the image sharpness detection is made coincident with the predetermined focal plane in the lateral shift detection.

Now, the focus condition detections of the image sharpness detection method and the image lateral shift detection method will be explained. As shown in FIG. 5B, when the evaluation function S for the image sharpness detection is selected and is compared with the threshold levels $\pm\Delta_1$ for the image sharpness detection, the detection results are obtained as follows: $-\Delta_1<S<\Delta_1$ . . . in-focus; $\Delta_1<S$ . . . forwardly de-focus; $S<-\Delta_1$ . . . backwardly de-focus. Moreover, when the evaluation function S' for the image lateral shift detection is selected and is compared with the threshold levels $\pm\Delta_2$ for the image lateral shift detection, the detection results are derived as follows: $-\Delta_2<S'<\Delta_2$ . . . in-focus; $\Delta_2<S'$ . . . forwardly de-focus; $S'<-\Delta_2$ . . . backwardly de-focus.

Figure 6A:
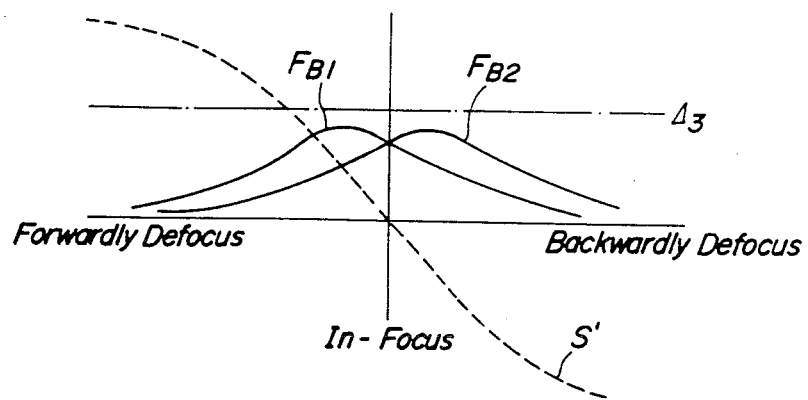
Figure 6B:
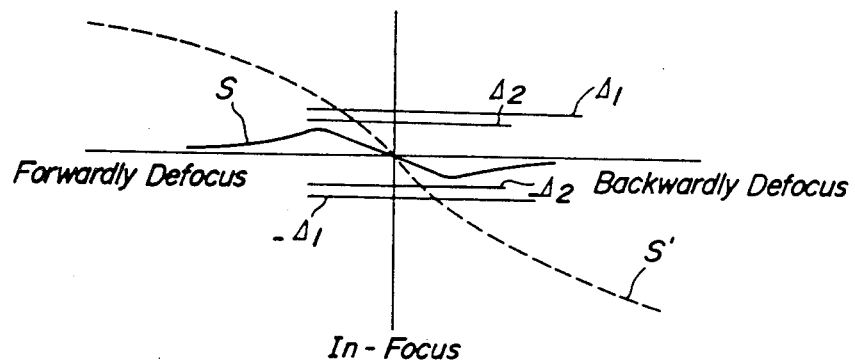

Therefore, according to the invention, even if the detection signal can hardly be derived due to the low contrast of the image i.e. the evaluation function values $F_{B1}$ and $F_{B2}$ are always smaller than the threshold value $\Delta_3$ within a detection range as shown in FIG. 6A, it is possible to detect the focus condition by utilizing the image lateral shift detection method which varies its evaluation value S' more abruptly near the best focus position than the evaluation value S for the image sharpness detection method as shown in FIG. 6B. Moreover, it is possible to eliminate an erroneous detection and an erroneous display due to a noise etc. In the present embodiment, the threshold values $\Delta_1$ and $\Delta_2$ can be preset suitably.

FIG. 7 is a block diagram showing one embodiment of a signal processing circuit preferably used in the above explained focus detection method according to the invention. In a circuit 80 for detecting the image sharpness, photoelectrically converted outputs derived from arrays of light receiving elements 81, 82 are sampled and held by sample and hold circuits 83, 84. The thus sampled and held signals are converted in a time sequential manner into digital signals by an A/D converter 85 and then supplied to a differential amplifier 88 so as to derive a difference $X_n-X_{n+1}$ between outputs of adjacent elements. Among absolute values of the thus obtained difference $X_n-X_{n+1}$ is derived the maximum value by processing circuits 89, 90, and the maximum value derived from one array of light receiving elements is stored in a memory 92 as the evaluation function value $F_{B1}$ and in the same manner the maximum value derived from the other array is stored in a memory 93 as the evaluation function value $F_{B2}$. Then, the difference between the evaluation functions $F_{B1}$ and $F_{B2}$ is calculated by a differential amplifier 94 so as to derive the evaluation function $S=F_{B1}-F_{B2}$ for the image sharpness detection. In this embodiment, the thus derived evaluation function S is further supplied to a window comparator 120 so as to detect forwardly defocus, in-focus and backwardly defocus conditions. The window comparator 120 comprises differential amplifiers 121, 122, invertors 123, 124 and AND gates 125 to 127, and serves to compare the evaluation function S with the predetermined thresholds $\pm\Delta_1$ so as to detect the focusing condition mentioned above and to generate an H-level signal from the AND gate 125, 126 or 127 in response to the thus detected focusing condition such as forwardly defocus, in-focus or backwardly defocus condition.

In a circuit 100 for detecting the image lateral shift, photoelectrically converted outputs derived from an array of light receiving element 101 are sampled and held by a sample and hold circuit 102. The thus sampled and held signals are converted into digital signals and then stored in memories 104, 104' alternately. Output signals derived from the memory 104 are supplied into shift registers 105, 107 successively to derive the values $A_n$, $A_{n+1}$. Then, after the values $B_n$, $B_{n+1}$ are obtained from the output signals derived from the memory 104' via shift registers 106, 108, these values $A_n$, $A_{n+1}$, $B_n$ and $B_{n+1}$ are supplied to differential amplifiers 109 and 110 so as to derive calculation values $A_n-B_{n+1}$ and $A_{n+1}-B_n$, respectively. Further, absolute values of these calculation values $A_n-B_{n+1}$ and $A_{n+1}-B_n$ are calculated by processing circuits 111, 112 and are supplied to a differential amplifier 113 and a processing circuit 114, so that the evaluation function for the image lateral shift detection, in this embodiment, $$S' = \sum_n \{|A_n - B_{n+1}| - |A_{n+1} - B_n|\}$$

is obtained. Hereinafter, in a window comparator 130 which has the same construction as that of the window comparator 120, the thus derived evaluation function S' is compared with the predetermined threshold values $\pm\Delta_2$ so as to generate an H-level signal from AND gate 135, 136 or 137 in response to the focusing condition such as forwardly defocus, in-focus or backwardly defocus condition.

In the embodiment mentioned above, the evaluation functions $F_{B1}$ and $F_{B2}$ for the image sharpness are read out from the memories 92 and 93, and are compared with the predetermined threshold value $\Delta_3$ by means of differential amplifiers 95, 96. The thus compared results are supplied to an OR gate 97, so that, in case of $F_{B1} < \Delta_3$ and $F_{B2} < \Delta_3$ i.e. in the region which can not effect the focus detection accurately by utilizing the image sharpness, output of the OR gate 97 becomes L-level and in the other case becomes H-level. Further, this output with H or L level is directly supplied to AND gates 141 to 143 as it is, and to AND gates 144 to 146 through an inverter 98. Under such a construction, it is possible to detect the focusing conditions such as forwardly defocus, in-focus and backwardly defocus accurately by utilizing the image lateral shift in the region which can not effect the focus detection precisely by the image sharpness or by utilizing the image sharpness in the region which can effect the the focus detection more precisely by the image sharpness than the image lateral shift.

Figure 8:
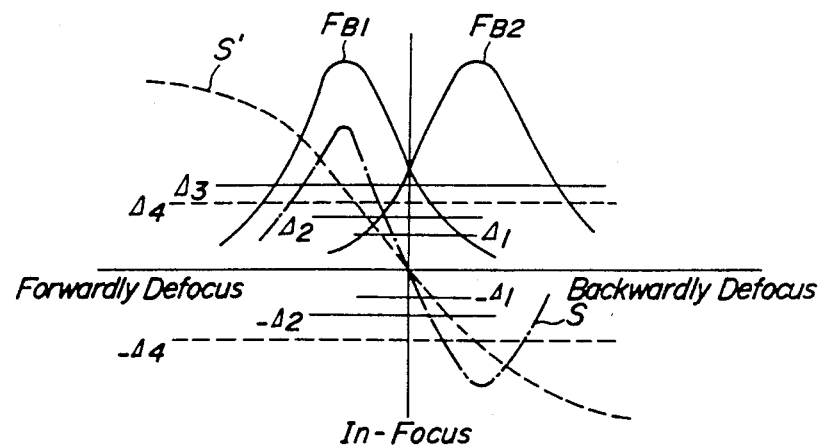
FIG. 8 is a graph for explaining another embodiment of the focus detection method according to the invention.

FIG. 8 is a graph for explaining another embodiment of the focus detection method according to the invention. In FIG. 8, the curves $F_{B1}$, $F_{B2}$, S, S' are same as those explained in FIGS. 5 and 6. In this embodiment, the evaluation function value S' for the lateral shift detection is at first compared with threshold values $\pm\Delta_4$. Then, if the evaluation function value S' is larger than the threshold value $+\Delta_4$, the detection result is determined as the forwardly defocus, and if the S' is smaller than $-\Delta_4$, the result is determined as the backwardly defocus. Moreover, when the evaluation function value is equal to $\pm\Delta_4$ or within the range of $\pm\Delta_4$, the evaluation function value S for the image sharpness detection is utilized at the same time and is compared with threshold values $\pm\Delta_1$. In this case, if the evaluation function value S is within the range of $\pm\Delta_1$ and further the evaluation function value S' is within the range of predetermined threshold values $\pm\Delta_2$, the detection result is determined as the in-focus condition. Moreover, the other decisions such as forwardly or backwardly defocus within the range of $\pm\Delta_4$ are performed by comparing the evaluation function values $F_{B1}$ and $F_{B2}$ for the image sharpness detection with a predetermined threshold value $\Delta_3$ in such a manner as mentioned below. In case that one of the evaluation function values $F_{B1}$ and $F_{B2}$ is larger than the threshold value $\Delta_3$, the decision is effected by utilizing the evaluation function S for the image sharpness detection. Contrary to this, in case that both of the evaluation functions $F_{B1}$ and $F_{B2}$ are smaller than the threshold value $\Delta_3$, the decision is performed by utilizing the evaluation function S' for the image lateral shift detection.

Figure 9:
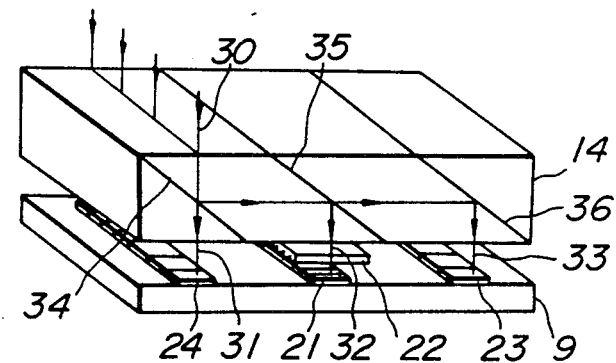
FIGS. 9 to 11 are perspective views illustrating embodiments of the optical system in the focus detection apparatus according to the invention.

FIG. 9 is a perspective view showing the detailed construction of the optical system used in the focus detection apparatus according to the invention shown in FIG. 1. In FIG. 9, an incident light flux 30 is divided into three light fluxes 31, 32, 33 by the half mirrors 34, 35 and the reflection mirror 36 integrally arranged in the light flux dividing prism 14. The light fluxes 31 and 33 are made incident upon the arrays of light receiving elements 24 and 23, respectively formed on the same semiconductor substrate 9 so as to detect the image sharpness. The other light flux 32 is used for detecting the lateral image shift and is made incident upon the array of light receiving elements 21 arranged on the same substrate 9 through the auxiliary optical system 22 integrally arranged to the prism 14. In the present embodiment, the auxiliary optical system 22 is formed by a cylindrical lenticular lens array. It should be noted that an amount of the light flux 31 is set substantially equal to that of the light flux 33. In this embodiment, since a light flux emitted from the same position of an image is used for both image sharpness and image lateral shift detection methods, it is possible to effect the focus detection precisely even for the object having a depth.

Figure 10:
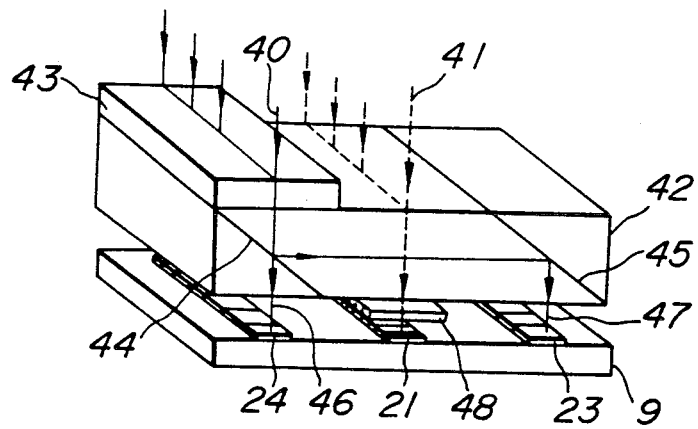

FIG. 10 is a perspective view showing another embodiment of the optical system preferably used in the focus detection apparatus according to the invention. In the present embodiment, the incident light is previously divided into two light fluxes 40 and 41 by means of a light flux dividing prism (not shown). The light flux 40 is then made incident upon an light flux dividing prism 42 via an optical path correction plate 43. The prism 42 comprises a half mirror 44 and a reflection mirror 45 and the incident light flux 40 is divided into two light fluxes 46 and 47 by these mirrors. Then, these light fluxes 46 and 47 are made incident upon the arrays of light receiving elements 24 and 23, respectively formed on the same substrate 9 so as to detect the image sharpness. The other incident light flux 41 is made incident upon the array of light receiving elements 21 arranged on the substrate 9 through the prism 42 and an auxiliary optical system 48 integrally arranged with the prism 42 so as to detect the lateral image shift. Also in this embodiment, an amount of the light flux 46 is substantially equal to that of the light flux 47. Moreover, in this embodiment, a light using efficiency can be improved as compared with the embodiment shown in FIG. 5, because a half of the incident light flux is made incident upon the array 21.

Figure 11:
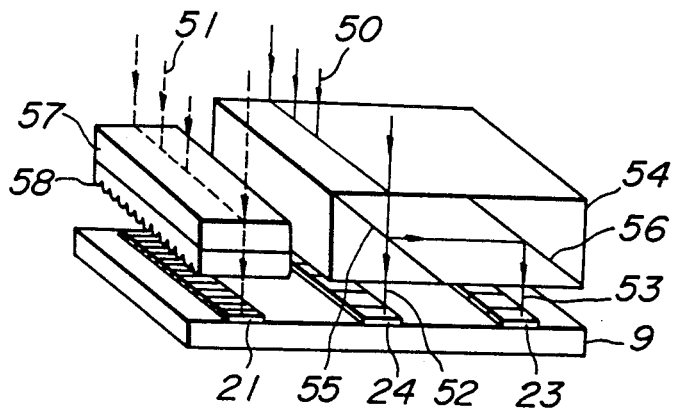

FIG. 11 is a perspective view showing still another embodiment of the optical system preferably used in the focus detection apparatus according to the invention. In this embodiment, the optical systems for the image sharpness and for the lateral image shift are arranged independently from each other, but the arrays of light receiving elements are arranged on the same substrate. It is possible to arrange these optical systems integrally or by connecting a part therebetween while keeping a positional relation of these optical systems as it is. In the embodiment shown in FIG. 11, an incident light flux is previously divided into two light fluxes 50 and 51. The light flux 50 is further divided into two light fluxes 52 and 53 by means of a prism 54 having a half mirror 55 and a reflection mirror 56 integrally arranged in the prism 14, and these light fluxes 52 and 53 are made incident upon the arrays of light receiving elements 24 and 23, respectively. The other incident light flux 51 is made incident upon the array of light receiving elements 21 formed on the substrate 9 through an optical path correction plate 57 and an auxiliary optical system 58 which are arranged integrally with each other. As is the same as the embodiments mentioned above, the arrays of light receiving elements 21, 23, 24 are formed on the same substrate 9.

In the embodiments shown in FIGS. 9 to 11, the arrays of light receiving elements 21, 23, 24 are formed on the same semiconductor substrate 9. Further on the same substrate 9 may be formed integrally a signal processing circuit, a driving circuit, and so on. Therefore, it is possible to accommodate all the optical systems and the circuits even in a small space of a compact camera.

According to the invention, since it is possible to detect the focusing condition by utilizing the lateral shift even for the low contrast image from which the detection signal by the image sharpness method can not be obtained, erroneous detection and indication due to the noise etc. can be prevented, and thus the accurate focusing detection can be performed over the whole range of the imaging optical system. Moreover, in the case that the focusing detection is performed near the in-focus region by utilizing both image sharpness and image lateral shift methods, it is possible to effect the focusing detection more accurately for any kind of images.

The present invention is not limited to the embodiments mentioned above, but various alternations and modifications are possible. For example, in the embodiment shown in FIG. 7, it is also possible to determine the focusing condition as the best focus position when the in-focus signals by the image sharpness detection and by the image lateral shift detection are generated, by supplying an output of the AND gate 136 to the AND gate 142. Moreover, in the embodiment shown in FIG. 7, the portion comprising the differential amplifiers 95, 96, the OR gate 97 and the invertor 98 is arranged in the output side of the evaluation function S' for the image lateral shift detection, and then the outputs of the AND gates 141 to 146 can be controlled in such a manner that, when this evaluation function S' is out of the range of $\pm\Delta_4$, the AND gates 141 to 143 are turned OFF and the AND gates 144 to 146 are turned ON, and on the contrary when S' is in the range of $\pm\Delta_4$, the AND gates 141 to 143 are turned ON and the AND gates 144 to 146 are turned OFF.

Further, in the embodiments explained above, the auxiliary optical system for dividing the light flux emanating from the imaging lens system is formed by the lenticular lens array, but it may be constituted by other optical systems such as a slit array, a micro lens array and a micro prism array.

What is claimed is:

1. In a method for detecting a focus condition of an imaging optical system by effecting an image sharpness detection to produce a first evaluation function value S representing a sharpness of an image formed by said imaging optical system on at least two light receiving element arrays and by effecting an image lateral shift detection to produce a second evaluation function S' representing a lateral shift of two images formed on at least one light receiving element array, said two images being formed by light fluxes transmitted through different areas of the imaging optical system, the improvement comprising the steps of:
   detecting the focus condition of the imaging optical system by processing said second evaluation function value S' produced by the image lateral shift detection in a first region far away from an in-focus position; and
   detecting the focus condition of the imaging optical system by processing both said first and second evaluation function values S and S' in a second region near the in-focus position.

2. A method according to claim 1, wherein said focus detection in the second region is performed in such a manner that when both evaluation values $F_{B1}$ and $F_{B2}$ from which the first evaluation value S is derived are smaller than a given threshold value, said focus detection is effected by utilizing said image lateral shift detection, and when at least one of said evaluation values are larger than said threshold value, said focus detection is effected by utilizing said image sharpness detection.

3. A method according to claim 1 or 2, wherein said focus detection in the first region is performed until the second evaluation function value S' is out of a given range, and when the second evaluation function value S' becomes within said given range, the focus detection is performed by using both the image sharpness detection and image lateral shift detection.

4. A method according to claim 3, wherein said focus detection in the second region is effected by the image sharpness detection when evaluation values $F_{B1}$ and $F_{B2}$ from which the first evaluation value S is derived are larger than a given threshold value and by the image lateral shift detection when the evaluation values are smaller than the treshold value.

5. A method according to claim 4, wherein said focus detection in said second region is performed by utilizing both said image sharpness detection and said image lateral shift detection in such a manner that when said first evaluation value S is within a second predetermined range and at the same time said second evaluation value S' is within a third predetermined range, the focus condition is determined as an in-focus condition.

6. An apparatus for detecting a focus condition of an imaging optical system comprising:
   means for dividing a light flux transmitted through an imaging optical system into at least three light fluxes;
   first and second light receiving element arrays arranged on respective sides of a predetermined focal plane for receiving first and second divided light fluxes from said three light fluxes to produce first and second sets of photoelectrically converted output signals;
   means for processing said first and second sets of output signals by image sharpness detection to derive a first evaluation function having a value S representing a sharpness of images formed on said first and second light receiving element arrays;
   a third light receiving element array disposed in proximity to said predetermined focal plane for producing a third set of photoelectrically converted output signals, said third light receiving element array being arranged with said first and second light receiving element arrays on a single semiconductor substrate;
   an auxiliary optical system arranged in front of said third light receiving element array for forming two images on said third light receiving element array in response to a third light flux from said three light fluxes transmitted through different areas of said imaging optical system;
   means for processing said third set of output signals by image lateral shift detection to derive a second evaluation function having a value S' representing a lateral shift of said two images formed on said third light receiving element array; and
   means for processing said first and second evaluation functions S and S' to detect the focus condition of the imaging optical system.

7. An apparatus according to claim 6, wherein said light flux dividing means comprises a prism including at least one half mirror and one reflecting mirror.

8. An apparatus according to claim 7, wherein said prism comprises first and second half mirrors and one reflecting mirror, said first light receiving element array is arranged to receive a light flux transmitted through said first half mirror, said second light receiving element array is arranged to receive a light flux reflected by the first half mirror, transmitted through the second half mirror and reflected by the reflecting mirror and said third light receiving element array is arranged to receive a light flux reflected by said first and second half mirrors.

9. An apparatus according to claim 8, wherein said auxiliary optical system is formed by a lenticular lens array integrally arranged with said light flux refelecting prism.

10. An apparatus according to claim 7, wherein said prism comprises one half mirror and one refelecting mirror, said first light receiving element array is arranged to receive a light flux transmitted through said first half mirror, said second light receiving element array is arranged to receive a light flux reflected by said half mirror and reflecting mirror and said third light receiving element array is arranged to receive a light flux transmitted through said prism.

11. An apparatus according to claim 10, further comprising a optical path length correction system arranged integrally with said prism.

12. An apparatus according to claim 7, wherein said prism comprises one half mirror and one reflecting mirror, said first light receiving element array is arranged to receive a light flux transmitted through said first half mirror, said second light receiving element array is arranged to receive a light flux reflected by said half mirror and reflecting mirror and said third light receiving element array is arranged to receive a light flux transmitted through an optical path length correction system and said auxiliary optical system which are arranged apart from said prism.

13. An apparatus according to claim 12, wherein said auxiliary optical system and optical path length correction system are arranged integrally with each other.

14. An apparatus for detecting a focus condition of an imaging optical system comprising:
means for dividing a light flux transmitted through an imaging optical system into at least three light fluxes, said light flux dividing means comprising a prism including at least one half mirror and one reflecting mirror and said first light receiving element array is arranged to receive a light flux transmitted through said half mirror, said second receiving element array is arranged to receive a light flux reflected from said half mirror and reflecting mirror and said third light receiving element array is arranged to receive a light flux transmitted through said prism;
first and second light receiving element arrays arranged on respective sides of a predetermined focal plane for receiving first and second divided light fluxes from said three light fluxes to produce first and second sets of photoelectrically converted output signals;
means for processing said first and second sets of output signals by image sharpness detection to derive a first evaluation function having a value S representing a sharpness of images formed on said first and second light receiving element arrays;
a third light receiving element array disposed in proximity to said predetermined focal plane for producing a third set of photoelectrically converted output signals, said third light receiving element array being arranged with said first and second light receiving element arrays on a single semi-conductor substrate;
an auxiliary optical system arranged in fron of said third light receiving element array for forming two images on said third light receiving element array in response to a third light flux from said three light fluxes transmitted through different areas of said imaging optical system, said auxiliary optical system being formed as a lenticular lens array integrally constructed with said prism;
means for processing said third set of output signals by image lateral shift detection to derive a second evaluation function having a value S' representing a lateral shift of said two images formed on said third light receiving element array; and
means for processing said first and second evaluation functions S and S' to detect the focus condition of the imaging optical system.

15. An apparatus for detecting a focus condition of an imaging optical system comprising:
means for dividing a light flux transmitted through an imaging optical system into at least three light fluxes, said light flux dividing means comprising a prism including at least one half mirror and one reflecting mirror and said first light receiving element array is arranged to receive a light flux transmitted through said half mirror, said second light receiving element array is arranged to receive a light flux reflected said half mirror and reflecting mirror;
first and second light receiving element arrays arranged on respective sides of a predetermined focal plane for receiving first and second divided light fluxes from said three light fluxes to produce first and second sets of photoelectrically converted output signals;
means for processing said first and second sets of output signals by image sharpness detection to derive a first evaluation function having a value S representing a sharpness of images formed on said first and second light receiving element arrays;
a third light receiving element array disposed in proximity to said predetermined focal plane for producing a third set of photoelectrically converted output signals, said third light receiving element array being arranged with said first and second light receiving element arrays on a single semiconductor substrate;
an auxiliary optical system arranged in front of said third light receiving element array for forming two images on said third light receiving element array in response to a third light flux from said three light fluxes transmitted through different areas of said imaging optical system, said auxiliary optical system being formed as a lenticular lens array integrally constructed with said prism, said third light receiving element array being arranged to receive a light flux transmitted through an optical path length correction system and said auxiliary optical system which are arranged apart from said prism;
means for processing said third set of output signals by image lateral shift detection to derive a second evaluation function having a value S' representing a lateral shift of said two images formed on said third light receiving element array; and means for processing said first and second evaluation functions S and S' to detect the focus condition of the imaging optical system.

16. In a method for controlling the focus of an imaging optical system which includes effecting an image sharpness detection to control focus during a first focus condition and effecting an image lateral shift detection to control focus during a second focus condition, the improvement in said method comprising:

effecting an image sharpness detection and an image lateral shift detection to control focusing during a predetermined portion of said first focus condition.

17. In an apparatus for controlling the focus of an imaging optical system which includes means for effecting an image sharpness detection to control focus during a first focus condition and means for effecting an image lateral shift detection to control focus during a second focus condition, the improvement in said apparatus comprising:

means for effecting an image sharpness detection and an image lateral shift detection to control focusing during a predetermined portion of said first focus condition.

* * * * *